United States Patent Office 2,710,866
Patented June 14, 1955

2,710,866

PROCESS FOR PREPARING 2-AMINO-4-HYDROXY-6-BROMOMETHYLPTERIDINE

Gino Carrara and Vitangelo D'Amato, Milan, Italy, assignors to Lepetit S. p. A., Milan, Italy, a corporation of Italy No Drawing. Original application April 1, 1949, Serial No. 85,031. Divided and this application August 3, 1953, Serial No. 372,158

Claims priority, application Italy December 1, 1948

5 Claims. (Cl. 260—251.5)

It is known that folic acid is one of the most important factors in the vitamin B complex and is an indispensable factor in the haematic cycle for ripening the megaloblasts. It therefore specifically serves for the treatment of diseases in which ripening of the megaloblasts does not take place owing to deficiency in food or physiological failures of the organism (macrocitarious anaemias generally, pernicious anaemia).

It was first isolated in 1941 by H. K. Mitchell, E. E. Snell and R. J. Williams (J. A. C. S. 63, page 2284, 1941) who, however, obtained a product which was impure and did not give any indication on its chemical composition.

On July 18, 1945, as it appears from an article published in the journal "Science" of August 31, 1945, a group of research engineers sponsored by Lederle Inc. and American Cyanamid Co. announced the main characteristics and synthesis of this important vitaminic factor. A subsequent publication by the above named authors, which appeared in the same Journal on May 31, 1946, vol. 103, No. 2683, pages 667–669, indicated the chemical composition and diagram of two syntheses of the substance, and a first method of purifying it was also indicated.

Successive publications in the American Journal of Physics, issue of January 1948, gave further details on the synthesis and purification of folic acid.

The structure of folic acid corresponds to that of pteroylglutamic acid, of which the formula is as follows:

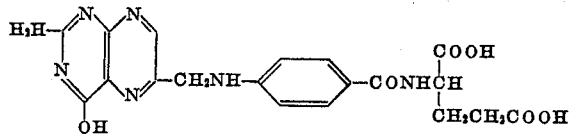

The synthesis indicated in the above mentioned publications are substantially as follows:

(1) Condensation of 2,4,5-triamino-6-hydroxy-pyrimidine with p-aminobenzoylglutamic acid and 2,3-dibromopropionaldehyde in an aqueous medium at pH 4. The resulting raw product contains about 15% folic acid.

(2) Condensation of 2,4,5-triamino-6-hydroxy-pyrimidine with 2,3-dibromo-propionaldehyde, pyridine and potassium iodide in order to obtain the iodide of N—[(2-amino-4-hydroxy-6-pteridyl)methyl]pyridone. This compound is then caused to react with the p-amino-benzoylglutamic acid and sodium methylate in ethylene glycol at 140° C. The resulting raw product contains about 15% folic acid.

(3) Condensation of diethyl ester of the p-amino-benzoylglutamic acid with reductone and subsequent reaction of this condensation product with 2,4,5-triamino-p-hydroxy-pyrimidine. The raw product contains about 20% folic acid.

(4) Transformation of the pyrimidone iodide obtained according to (2) above into 2-amino-4-hydroxy-6-methylhydropteridin; oxidation of the latter to the corresponding pteridin; halogenation thereof and condensation of the halogen derivative with diethyl ester of the p-aminobenzoylglutamic acid, in order to obtain a raw product averaging approximately 14% folic acid.

In Patent 2,436,073 of November 29, 1945, Lederle Inc. claims the preparation of folic acid by condensation of the 2,4,5-triamino-6-hydroxy-pyrimidine with bromopiruvaldehyde or its acetal and p-aminobenzoylglutamic acid, in order to obtain a raw folic acid, of which the percentage is not indicated.

Later on, the chemists of Lederle Inc., in order to avoid side reactions which always take place in the several syntheses of folic acid, condensed 2-amino-4-hydroxy-6-bromoethylpteridine with p-aminobenzoylglutamic acid (U. S. 2,547,519—July 27, 1946), obtaining so folic acid by an unambiguous reaction.

Although this process is evidently superior to the above described syntheses with regard to the purity of the end product, it was not commercially practicable, as 2-amino-4-hydroxy-6-bromomethyl-pteridine was in turn obtained by bromination of 2-amino-4-hydroxy-6-methyl-pteridine. This intermediate is prepared starting from carbomethoxypyruvaldehyde dimethylacetal, a not easily available material, by condensing it with 2,4,5-triamino-6-hydroxypyrimidine; the obtained 2-amino-4-hydroxy-6-pteridineacetic acid is then decarboxylated in a nitrogen atmosphere by heating it for 6 hrs. at 270°.

We have now found that 2-amino-4-hydroxy-6-bromomethylpteridine can be obtained by a very simple way by directly condensing 2-4-5-triamino-6-hydroxy-pyrimidine with 2,3-dibromopropionaldehyde. The bromo-derivative averages 70% in purity, and is well suitable for reacting with p-aminobenzoylglutamic acid, yielding a folic acid of unambiguous constitution and of a high degree of purity.

The following example gives a typical method of preparing 2-amino-4-hydroxy-6-bromomethylpteridine, and of condensing it with p-aminobenzoylglutamic acid to obtain folic acid.

Example

A solution of 42.8 g. 2-4-5-triamino-6-hydroxypyrimidine-dihydrochloride in 400 ml. water and 600 ml. N/1 NaOH is mixed with a solution of 43.2 g. 2,3-dibromopropionaldehyde in 500 ml. benzene; the mixture is shaken mechanically for 30 minutes. A red-brown precipitate forms, which is collected on a vacuum filter and washed with water, ethyl alcohol, acetone and ethyl ether. 36 g. of product are obtained, which assays 22% bromine against a theoretical amount of 31.45%; this corresponds to a content of about 70/ 2-amino-4-hydroxy-6-bromomethylpteridine.

18.3 g. 70% 2-amino-4-hydroxy-6-bromomethylpteridine, 13.3 g. p-aminobenzoylglutamic acid and 6.5 g. anhydrous potassium carbonate are suspended in 200 ml. anhydrous isocamyl alcohol. The mixture is refluxed for 2 hrs., then the solvent is removed in vacuo and the residue is washed with ethyl alcohol and ethyl ether. 28–30 g. dry product are obtained, which assays 7–8% folic acid. The present application is a division of our copending application Serial No. 85,031, filed April 1, 1949, now abandoned.

What we claim is:

1. Process for preparing 2-amino-4-hydroxy-6-bromomethylpteridine which comprises reacting 2,4,5-triamino-6-hydroxypyrimidine with 2,3-dibromopropionaldehyde in a two-phase reaction medium comprising water and a substantially water-immiscible organic solvent.

2. Process according to claim 1, wherein the reaction takes place in an alkaline medium.

3. Process according to claim 1, wherein the two-phase system is subjected to active shaking during the course of the reaction.

4. Process for preparing 2-amino-4-hydroxy-6-bromomethylpteridine, which comprises mixing 2,4,5-triamino-6-hydroxypyrimidine dihydrochloride with an excess of an aqueous solution of an alkali metal base, adding to the aqueous mixture a solution of 2,3-dibromopropionaldehyde in an organic solvent which is substantially immiscible with water and separating the precipitate which is formed.

5. Process according to claim 4, wherein the organic solvent is benzene.

References Cited in the file of this patent

FOREIGN PATENTS 171,733   Austria _____ June 21, 1952